May 13, 1947.  J. E. LOVELY  2,420,547
PROFILE MILLING MACHINE
Filed April 22, 1944   6 Sheets-Sheet 1

INVENTOR.
John E. Lovely
BY
Francis E. Blake
Atty.

May 13, 1947.　　J. E. LOVELY　　2,420,547
PROFILE MILLING MACHINE
Filed April 22, 1944　　6 Sheets-Sheet 2

INVENTOR.
John E. Lovely
BY
Francis E. Blake
Att'y.

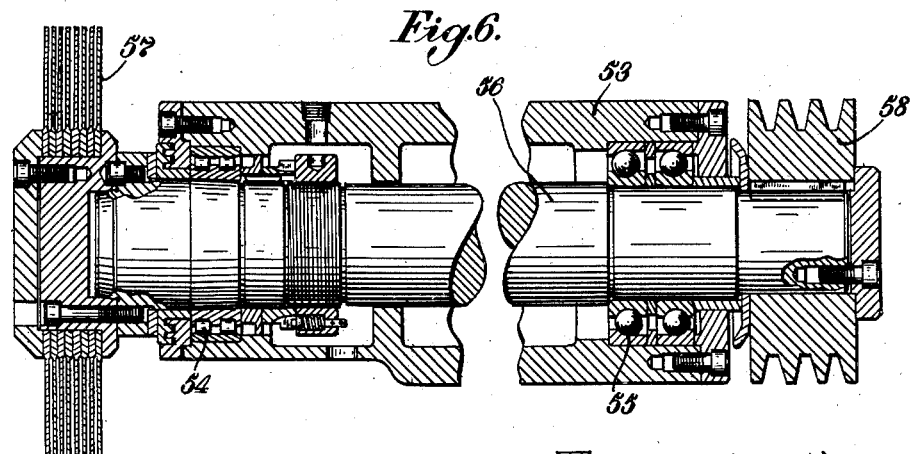
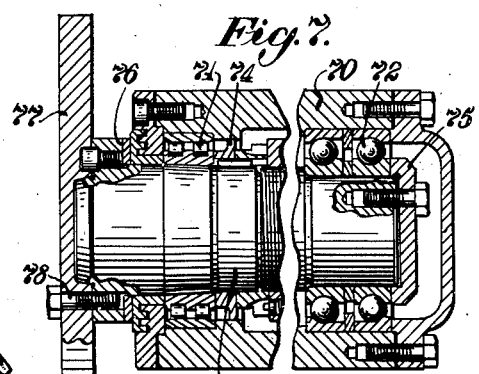
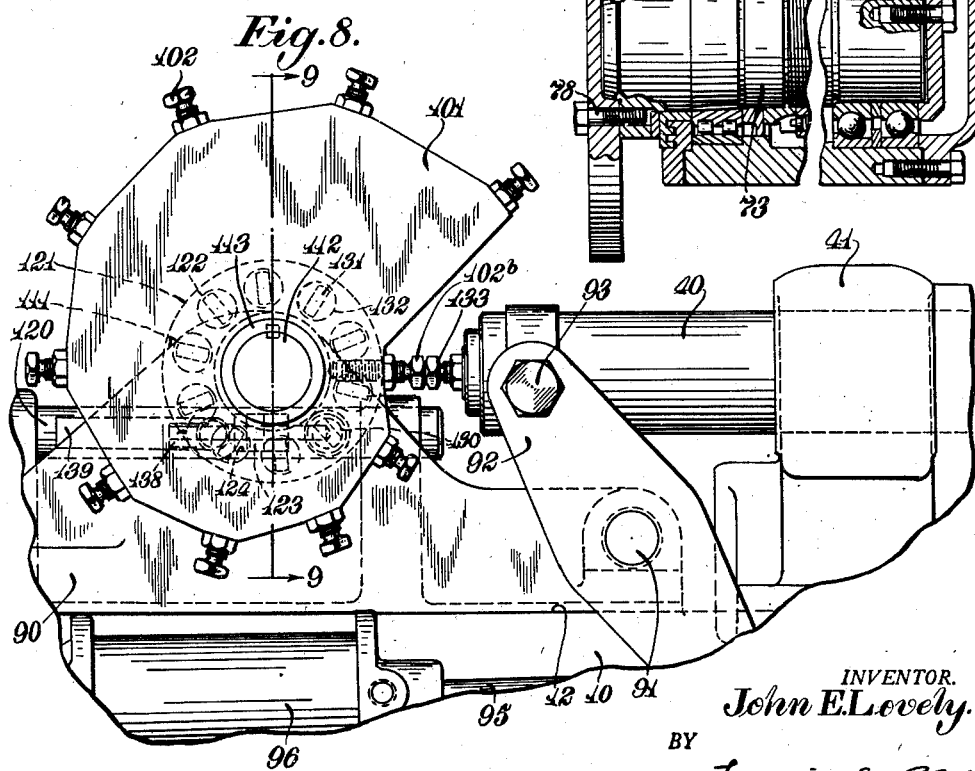

INVENTOR,
John E. Lovely
BY
Francis E. Blake
Atty.

May 13, 1947.　　　　J. E. LOVELY　　　　2,420,547
PROFILE MILLING MACHINE
Filed April 22, 1944　　　　6 Sheets-Sheet 5

INVENTOR.
John E. Lovely
BY
Francis E. Blake
Att'y.

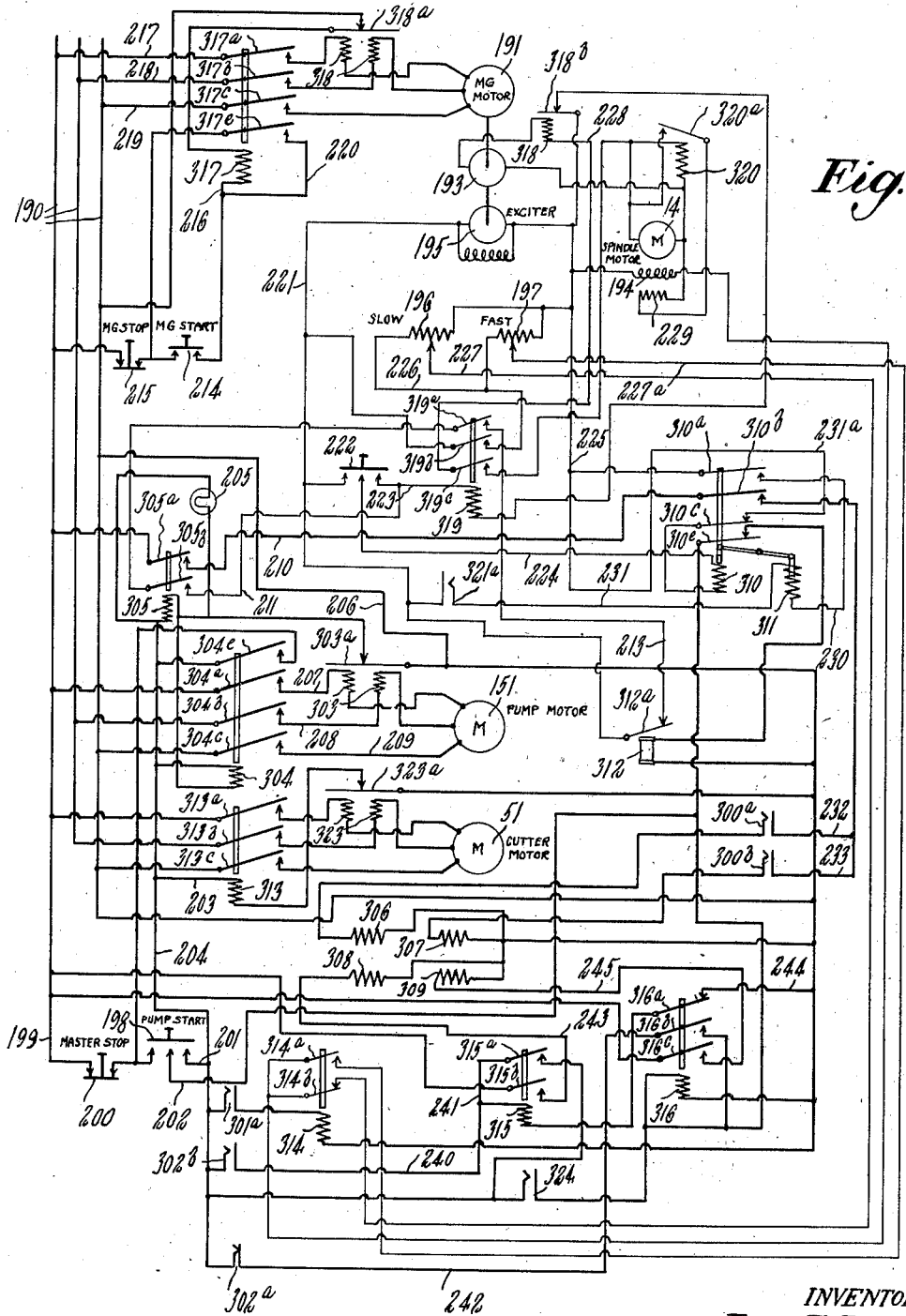

Patented May 13, 1947

2,420,547

UNITED STATES PATENT OFFICE 2,420,547

PROFILE MILLING MACHINE

John E. Lovely, Springfield, Vt., assignor to Jones & Lamson Machine Company, Springfield, Vt., a corporation of Vermont Application April 22, 1944, Serial No. 532,287

3 Claims. (Cl. 90—13.7)

The present invention relates to a milling machine and more particularly to a profile milling machine adapted to machine a series of parallel cuts or slots to irregular profiled depths in work pieces of symmetrical or unsymmetrical outlines.

It is the principal object of this invention to provide a profile milling machine embodying and modifying the basic principles of operation of the well known "Fay" automatic lathe so that a series of parallel slots may be automatically machined to desired depths of irregular depth profiles around the outer surfaces of a work piece such as for example a cylinder forging to thus produce a plurality of cooling ribs thereon for air-cooled application.

It is also an important object of this invention to provide a profile milling machine having means for supporting and rotating a work piece together with means supporting a rotary cutting tool for movement transversely of the work axis in accordance with a controlling profiled cam surface to vary the cutting depth to the desired depth profile as the work is slowly rotated past the cutting tool.

It is a further object of this invention to provide a milling machine of the character described in which the rotary cutter means is adapted to be automatically moved a predetermined amount axially of the work after each cutting or slotting operation to the desired depth profile on the work so that an additional cutting or slotting operation to a desired depth profile may be obtained parallel to the first produced slotting operation, to thus enable a rib or fin of desired thickness to be produced on the workpiece.

Since it may be desirable that the various parallel cutting or slotting operations be controlled to produce parallel slots of different irregular depth profiles, it is also an object of this invention to provide a profile milling machine of the character described having a series of variously profiled cam surfaces adapted to be indexed into controlling relation with the cutting means as the cutting means is moved axially of the work to produce the successive parallel slots of different irregular depth profiles.

It is a still further object of this invention to provide a profile milling machine of the character described in which the profiled cams for controlling the transverse movement of the cutting means into the work to desired profile depths are mounted on a spindle in parallel relation to each other and are angularly located in relation to the outline of the workpiece and adapted to be rotated in accordance with the rotation of the workpiece past the cutting means, so that the depth of cut at any one point on the work is controlled to the desired profile depth in relation to the outline and function of the workpiece.

The profile milling machine of this invention is so designed and constructed as to be entirely automatic in its operation and enables a series of sequential parallel cutting or slotting machinings or cycles to various depth profiles to be automatically controlled in relation to a workpiece, such as for example a cylinder forging, to thus produce a plurality of cooling fins or ribs thereon.

Further objects and advantages of this invention will be apparent by reference to the following specifications and drawings in which:

Figure 6 is a longitudinal broken section of the rotary cutting tool spindle and showing one optional form of rotary cutting tool, such as a bank of parallel metal cutting saws.

Figure 7 is a longitudinal broken section of the cam idler roll spindle on the cutting means for engagement with the rotary profile cams.

Figure 8 is a fragmentary front elevation showing in detail the indexing means for spacing the cutter means axially of the work and selecting the different profiled control cams for controlling the depth profile of each cutting operation.

Figure 15 is an electrical wiring diagram for the machine.

Figure 1:
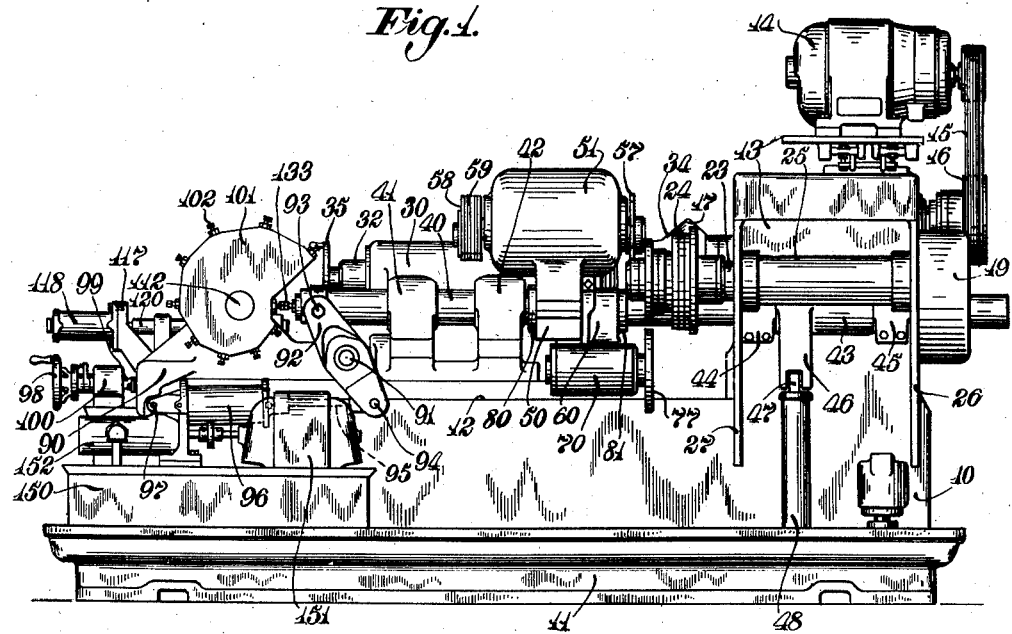
Figure 1 is a rear elevation of the profile milling machine of this invention.
Figure 2:
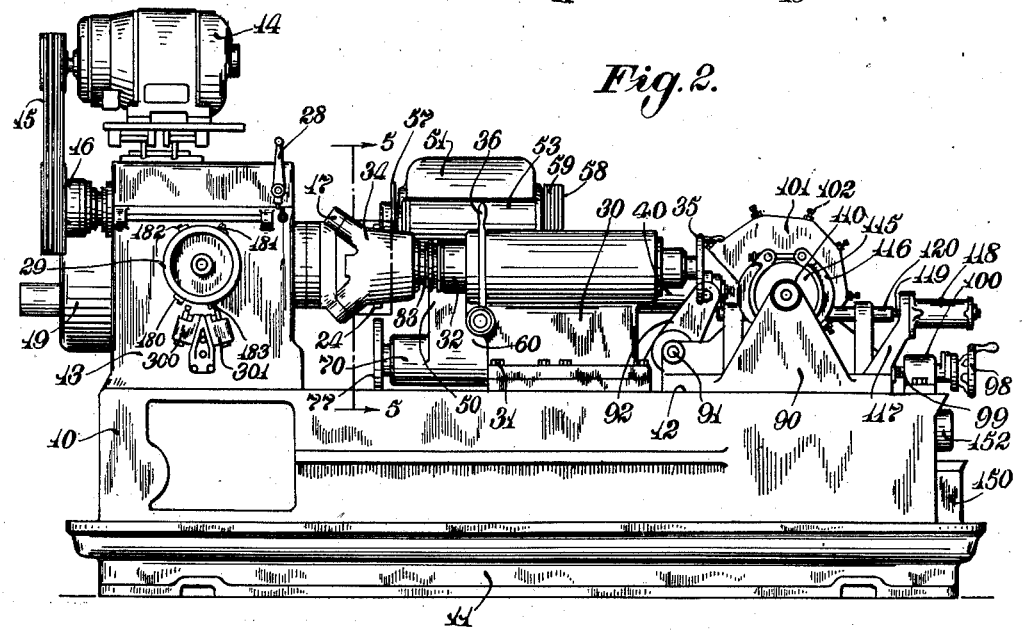
Figure 2 is a front elevation.

The present embodiment of this invention is automatically operated and controlled by a combined electrical and hydraulic system. The rotary movements of the various parts of the machine are obtained through electric motors while the axial and transverse movements of the cutter mechanism are hydraulically obtained and the whole inter-relation of movements are automatically initiated and sequenced by an electrical control system, which is timed in accordance with the rotation of the workpiece.

Referring to Figures 1 through 5 for a general understanding of the invention, the machine is provided with a bed casting 10, having the usual drip pan 11 and slide rails 12. At one end of the machine the headstock casing 13, enclosing therein the conventional spindle driving gears (not shown), is mounted. A variable speed, direct current electric motor 14 is belted at 15 to the drive pulley 16 of the headstock gears. A fixture chuck 17, which may be specially designed for chucking a workpiece of irregular outline such as cylinder forging, is mounted on one end of the headstock or workpiece spindle 18 and as will be more fully described in connection with Figure 13 of the drawings, is so mounted on the headstock spindle 18 as to angularly and axially locate the workpiece in relation to the profiled control cams and the cutter mechanism. At the other end of the headstock spindle 18, and enclosed in the housing 19, is mounted a spur gear 20, connected thru idler gear 21 rotatable around the bar 40, to a spur gear 22 keyed to a rotatable spindle 23. At the other end of the cam spindle 23 are mounted a number of profiled control cams for controlling the variation of the transverse movement of the cutter mechanism into the workpiece in accordance with their profiles. These cams are generally indicated by 24 of Figure 1 but are shown more in detail and will be described further in connection with Figures 5 and 13 of the drawings.

Since, in the present embodiment, the gears 20, 21, and 22 are shown to be of equal ratio, it should be obvious that the control cam spindle 23 will be rotated at exactly the same speed as the workpiece spindle and that the angular relation of the workpiece fixture chuck to the profiles of the cams will always be the same. The control cam spindle 23 is journalled in suitable bearings 23a and 23b (see Figure 13) mounted in the tubular housing 25 which is fastened to brackets 26 and 27 welded to the headstock casing 13 and the bed 10 of the machine. A control lever 28 is provided to clutch the workpiece spindle to the driving gears and thus start the machine. No provision has been made in the present embodiment to select various gear trains and connect different gear ratios in the headstock to the headstock spindle, as in the present operation of the machine the workpiece is intended to be rotated at a speed range varying from ½ to 5 R. P. M. and this range may be easily obtained and controlled by varying the D. C. voltage supply to the electric motor 14. An electrical control cam drum 29 is also geared to the headstock spindle thru any suitable gearing (not shown) and this gearing may be such as to rotate the cam drum 29 at half the speed of the headstock spindle. The function of this cam drum 29 will be described further in connection with the electrical operation and control of the machine.

Mounted on the slide rails 12, is a tailstock assembly 30, which is adjustable longitudinally of the machine but is semi-permanently fixed in a desired position by the bolts 31. The tailstock 32 has a fixture 33, which may be specially designed as shown, for rotatably supporting the workpiece 34, which in this instance is shown to be a cylinder forging. The tailstock fixture is movable into and out of supporting relation with the workpiece by rotating the handwheel 35 as is conventional in the art. A lever 36 frictionally locks the tailstock fixture in its desired position.

Figures 3, 4, 5:
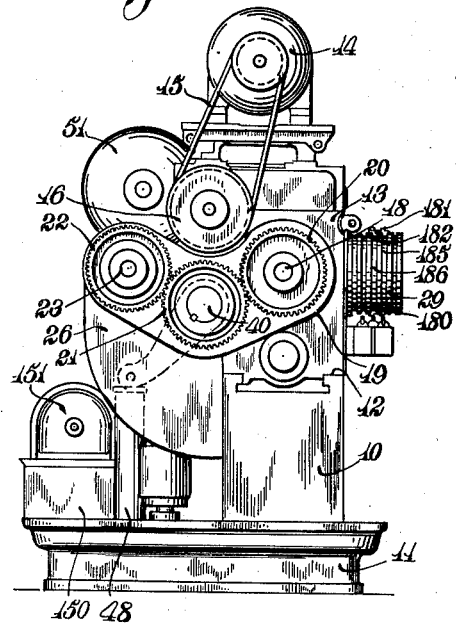
Figure 3 is an end elevation of the headstock end of the machine.
Figure 4 is an end elevation of the tailstock end of the machine.
Figure 5 is a transverse section on the line 5—5 of Figure 2 showing the relations of the profiled control cams, rotary cutting tool and workpiece.
Figure 9:
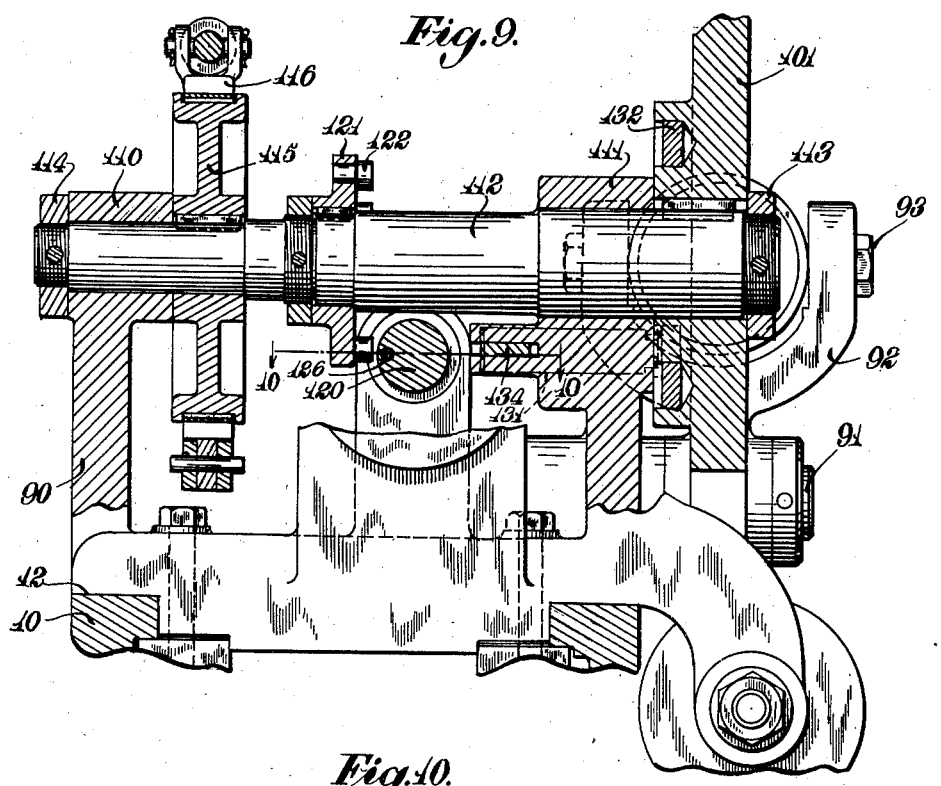
Figure 9 is a section taken on the line 9—9 of Figure 8.
Figure 10:
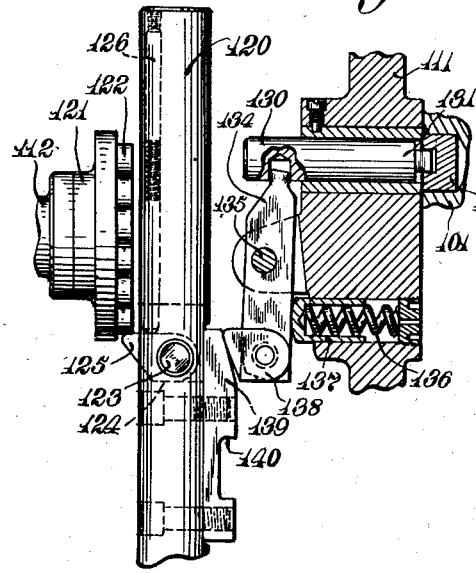
Figure 10 is a section taken on the line 10—10 of Figure 9.

Referring to Figures 1 and 3 of the drawings, a cylindrical bar 40 is mounted to the rear and above the bed of the machine. This bar 40 which may be of a length approximate to three-fourths the length of the machine is rotatably and slidably journalled in bearings 41 and 42 fixed to the rear of the tailstock assembly 30 and bearings 44 and 45 bolted to the rear of the headstock casing 13. A bell-crank hub 43 surrounds the headstock end of the bar 40 and is connected to the bar 40 by means of a number of spline connections or keys not shown. Thus angular movement of the hub 43 will cause a corresponding angular movement of the bar 40 although the bar may be moved axially of the hub 43. The bell-crank 46 is connected to the piston rod 47 of the hydraulic actuator 48 so that movement of the piston rod 47 causes a rotation of the cylindrical bar 40 which, as described, is also free to move longitudinally of the machine in the bearings 41, 42, 44 and 45.

Referring to Figures 1, 4 and 5. A bracket casting 50 is keyed to the bar 40 by means of the key 39. The bracket casting 50 is adapted to support the electric cutter motor 51 fixed to the casting by bolts 52. The bracket casting 50 also is provided with a hub portion 53 (see Figures 2 and 6) having journalled therein the bearings 54 and 55 in which is mounted a revoluble cutting tool spindle 56. At one end of the spindle 56 is keyed the cutting tool 57 which in this instance is a metal cutting saw and at the other end of the spindle a pulley 58 is keyed. Belts 59 connect the motor 51 to the pulley 58 of the cutting tool spindle. Also journalled on the bar 40 but not keyed thereto is the cam roller bracket support 60. The support 60 is fastened to the support 50 by means of the bolts 61 passing through the arcuate slots 62 of the support 60. By loosening the bolts 61, the adjustably fixed angular relation of the support 60 to the support 50 may be adjusted within the limits of the arcuate slots 62. To enable a precise adjustment of this relation to be obtained, the adjusting screws 63 and 64 threaded in the lugs 65 and 66 which are part of the support 50 are provided to abut the lug 67 which is a part of the support 60, and movement of the adjusting screws against the lug 67 will therefore cause a precise angular movement of the housing 60 in relation to the housing 50. The housing 60 is enlarged at its free end, as shown, to provide a journal 70 (see Figures 1 and 7) having positioned therein the bearing assemblies 71 and 72 for revolubly supporting a cam idler or follower roll spindle 73. The spindle 73 is prevented from axial movement by the adjustable collars 74 and 75 and the shoulder 76. Fastened to the shoulder 76 by the bolts 78 is the cam idler or follower roll or disc 77. The supports 50 and 60 are prevented from axial movement along the bar 40 by means of split collars 80 and 81 clamped to the bar 40 as by the bolt 82. Since the support 50 is keyed to the bar 40 and the support 60 is fastened to the support 50, it should be apparent that angular movement of the bar 40 will cause a corresponding movement of the supports 50 and 60, enabling the cutting tool 57 to be moved transversely of the work axis and bringing the cam idler roll 77 into or out of engagement with one of the profiled cams 24, as shown by Figure 5.

By supplying a constant fluid pressure to one end of the actuator 48 during the cutting operation, the supports 50 and 60 will be constantly urged to feed the cutter mechanism transversely into the workpiece and keep the cam idler roll 77 in contact with one of the profiled cams 24, as the cams and workpiece 34 are rotated in unison and at the same speed. Thus a cut or slot will be produced in the work to the desired depth profile as controlled by one of the profiled cams 24. At the time of machine assembly, the cams 24 are angularly positioned and fixed on the cam spindle 23 in relation to the angular position of the workpiece and its outline as determined by the special fixture 17, and therefore, the depth profile for the cutting operation will be properly synchronized with the outline of the workpiece.

Figure 13:
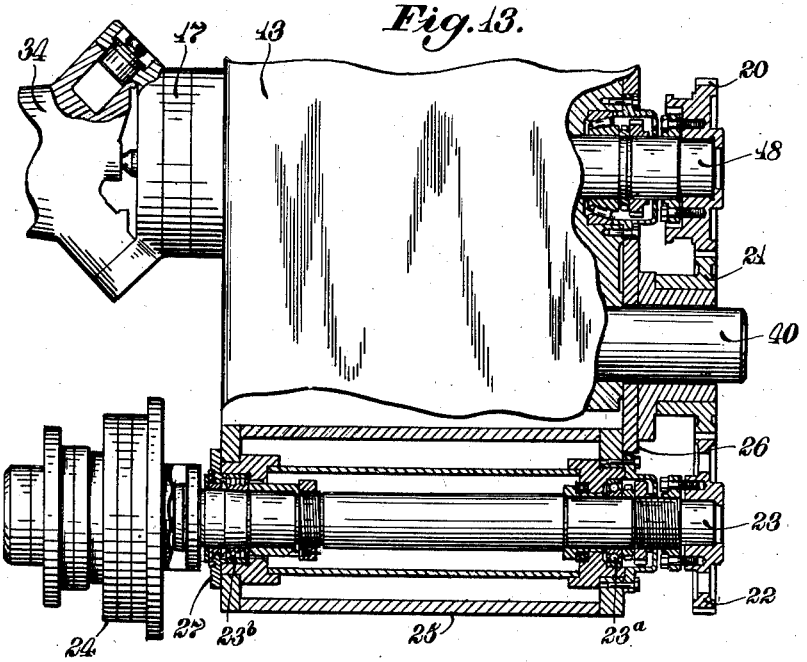
Figure 13 is a fragmentary top elevation partly in section of the headstock end of the machine and showing the relation of the rotary work spindle and the rotary cam spindle.

Referring to Figures 1, 2, 4 and 8 of the drawings, apparatus is provided for moving the cutter and cam idler roll assembly axially of the workpiece to enable a series of slots to be machined parallel to each other on the workpiece. Since each successive slot may be of a different depth profile, a plurality of differently profiled cams 24, equal in number to the number of differently profiled parallel slots, may be mounted on the cam spindle 23 as shown by Figure 13 and the axial movement of the cutter assembly before each successive slotting operation will bring the cam idler roller 77 into controlling relation with successive ones of the differently profiled cams 24.

The mechanism for controlling the axial movement of the cutter assembly is mounted on a supporting framework 90 which is slidably mounted on the slide rails 12 beyond the tailstock assembly. Pivotally carried at 91 by the framework 90 is a rocker arm 92. One end of the rocker arm 92 is pivotally connected at 93 to the bar 40 and the other end of the rocker arm 92 is pivotally connected at 94 to the piston rod 95 of a hydraulic actuator 96. The hydraulic actuator 96 is pivotally supported at 97 by the framework 90. The framework 90 carrying the actuator 96 and the rocker arm 92 is movable along the slide rails 12 and adjusted in precise relations to the workpiece by means of handwheel 98 which is keyed to the threaded adjusting rod 99 connected to the framework 90 and passing through the threaded bracket 100 fixed to the machine bed 10. By rotating the handwheel 98, the framework 90 is moved longitudinally of the machine bed and hence through the rocker arm 92 carried by the framework 90, the bar 40 is correspondingly moved longitudinally or axially. This enables the bar and cutter assembly to be initially adjusted axially of the workpiece to bring the cam idler roller 77 into correct alignment with the first of the profiled cams 24 and also to bring the cutting tool to the desired cutting point axially of the workpiece as determined by the special fixture 17. After a slot to the desired depth profile has been machined as previously described, fluid pressure is supplied to the actuator 48 in a manner to rock the bar 40 and move the cutting tool 57 and the cam idler roller 77 out of engaging relations with the workpiece and profiled control cam. Hydraulic pressure is then supplied to the actuator 96 in such manner as to move the piston rod 95, rocker arm 92 and bar 40, so that the bar 40 carrying the cutter assembly will be moved toward the headstock end of the machine against a positive stop and with the cam idler roller 77 clearing the group of profiled control cams 24. While the bar 40 is at the extreme end of its travel towards the headstock end of the machine an index plate 101 is rotated to bring a successive adjustable stop 102 into position for determining the limit of return for the bar 40 in the direction of the tailstock and hence aligning the cam idler roller 77 with a successive profiled cam and spacing the cutter 57 axially of the workpiece in relation to the first produced slot to determine the thickness of the fin to be produced by the parallel slot.

The mechanism for rotating the index plate 101 is shown in detail by Figures 2, 8, 9 and 10 of the drawings. The framework 90 is journalled at 110 and 111 to receive a shaft 112 transverse to the spindle and on one end of which is keyed the index plate 101, held on the shaft by the collar 113. The collar 114 cooperates with the collar 113 and index plate 101 to axially align the shaft 112 in the journals 110 and 111. Also keyed on the shaft 112 is the brake drum 115 around which a spring loaded brake 116 is constantly braked to assure that the shaft 112 can not be rotated except when desired and to assure that the rotation of the shaft 112 will cease immediately upon the cessation of a force applied to rotate the shaft against the tension of the brake. Supported by the bracket 117 of the framework 90, is a hydraulic actuator 118 having a piston rod 119 connected to a shaft 120, centrally and slidably mounted on the framework 90 at right angles to and beneath the shaft 112. Also keyed to the shaft 112 is the flanged hub 121 having a plurality of lugs 122, equal in number to the number of adjustable stops 102 on the index plate 101 radially spaced and located in relation to the radial spacing of the adjusting stops 102. Pivotally mounted at 123 within a slot 124 of the shaft 120 is a latch member 125, normally maintained by the spring plunger 126 in the position shown by Figure 10. When fluid pressure is supplied to the actuator 118 in a manner to cause the shaft 120 to be moved toward the headstock end of the machine, the spring latch 125 abuts one of the lugs 122 on the flange 121 and causes a rotation of the shaft 112 and index plate 101. The mechanism just described is so designed and proportioned as to rotate the index plate 101, an angular amount equal to the angular spacing of the adjustable stops 102. Upon supplying the fluid pressure to the actuator 118 in such manner as to move the shaft 120 in the direction away from the headstock end of the machine, the spring latch 125 will be depressed in passing the lug 122 in its path, thus acting as an escapement, so that the shaft 112 can be rotated only in one direction and by the proper direction of movement of the shaft 120, towards the headstock end of the machine.

To accurately locate and lock the index plate 101 in each of its successive angular positions, a locking bolt 130 having a flattened end 131, is provided. The index plate 101 is also provided with a series of recessed inserts 132, having openings shaped to cooperate with the end 131 of the locking bolt 130. These inserts are accurately angularly positioned on the index plate in relation to the adjustable stops to assure the indexing of the stops at the exact positions to cooperate with the adjustable stop 133 on the bar 40. The locking bolt 130 is normally held in the locking position of Figure 10 in response to the lever 134 pivoted at 135 and urged by the spring 136 and plunger 137 to the position shown. A pivoted latch member 138 cooperates with a cam surface 139 fixed to the bar 120 so that a movement of the bar 120 in a direction to rotate the index plate causes the locking bolt 130 to first be withdrawn from locking relation to the index plate 101. At the end of the index plate rotating stroke of the shaft 120, the latch 138 is dropped into the recess 140 of the cam surface 139, causing the locking bolt 130 to be moved into locking relation with the succeeding recessed insert 132 for the new angular position of the index plate 101, thus indexing a succeeding adjustable stop 102 to cooperate with the stop 133 of the bar 40, the stop 102 then being alined with the bar. Due to the pivotal effect of the latch 138, the return stroke of the shaft 120, does not affect the locking bolt mechanism.

In order that the operation of the machine may be more fully understood, a complete cycle of operation will now be described. A workpiece (in this example a cylinder forging) is placed in the headstock fixture 17 and clamped thereby adjusting the tailstock 32. The fixture 17 may be so designed as to angularly locate the outlines of the workpiece in relation to the outlines of the profiled cams 24. The handwheel 98 is then turned to adjust the axial position of the cutter mechanism to bring the cam idler roller 77 into correct alignment with the first of the cams 24, controlling the depth profile of the first cut. The cams positioned on the cam spindle at the time of machine assembly are in the correct axial relation to the workpiece fixture 17 so that with the cam idler roller 77 in correct alignment with the first of the cams 24, the cutting tool 57 is axially positioned to the workpiece at the point where the first cut is to be produced. Current is supplied to the motor 14, to cause the revolution of the workpiece and cam spindle at a desired speed. Fluid under pressure is supplied to the actuator 48 in a manner to cause transverse movement of the cutting tool into the workpiece 34 as determined and limited by the profiled cam 24 in association with the cam idler roller 77, attached to the cutter mechanism as previously described. At the completion of one revolution of the work past the cutting tool in cutting relation to produce a slot having a depth profile corresponding to the profile of the profile cam surface, fluid under pressure is supplied to the actuator 48 in a manner to cause the withdrawal of the cutting tool from the workpiece and the cam idler roller from the control cam. Fluid under pressure is then supplied to the actuator 96 to move the bar 40 and the cutting mechanism towards the headstock until the adjustable stop 133 will clear any of the adjustable stops 102 on the index plate 101. With the bar in this position, fluid pressure is supplied to the actuator 118 to move the shaft 120 towards the headstock end and cause the index plate 101 to be moved and locked into the next index position of the adjustable stops 102 in relation to stop 133. The application of fluid pressure to actuators 118 and 96 is then reversed and the shaft 120 and the bar 40 are moved in a direction away from the headstock end of the machine. The movement of the bar 40 is now limited by the new adjustable stop position 102 to axially locate the cutting mechanism and cam idler roller in relation to the workpiece and a successive profiled cam to thus produce a second cut or slot on the workpiece parallel to the first produced slot and controlled to desired depth profile by the successive profiled cam. The cycle of operation is then repeated through as many indexed stop positions and profiled control cams as may be desired. In this connection it may be noted that an optional form of cutting tool 57 is shown by Figure 6 of the drawings to be a multiple bank of metal saws and this type of cutting tool gives a plurality of identical depth profiled slots for each indexed position of the cutting mechanism.

Figure 14:
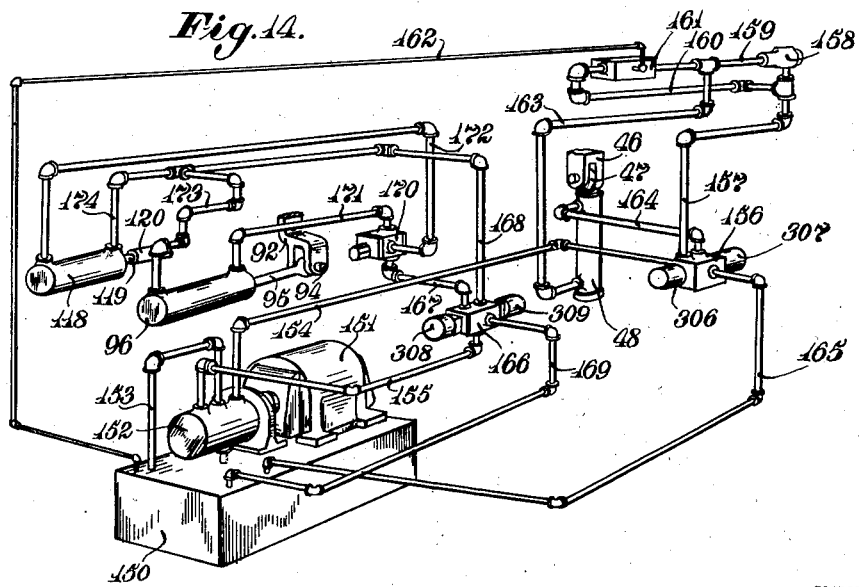
Figure 14 is a diagrammatic view in perspective of the hydraulic system of the machine.

In order that the cycle of operation just described above may be automatically initiated and sequenced to obtain completely automatic operation of the machine, a combined hydraulic and electrical control system is employed. Figure 14 of the drawings show a diagrammatic view in perspective of the hydraulic system including the solenoid operated hydraulic valves. A storage tank 150 for hydraulic fluid is provided with an electric pump motor 151 and a double barrelled rotary pump 152 mounted thereon. When the pump 152 is operating, fluid is drawn from the tank 150 through the line 153 and discharged under pressure into the lines 154 and 155. The fluid pressure in line 154 is supplied to the solenoid valve 156 which selectively supplies fluid under pressure to either side of the actuator 48 for moving the bell crank 46 and hence the bar 40 to feed the cutter mechanism into or withdraw it from the workpiece. When the solenoid 306 is energized fluid under pressure from line 154 passes through valve 156 into line 157 and to the check valve 158. The check valve 158 is so constructed as not to permit the passage of fluid under pressure from line 157 to line 159. The fluid pressure therefore passes from line 157 into line 160 from which it enters a metering valve 161 of conventional design. The metering valve 161 may be adjusted to vary the pressure passing from line 160 to line 159 and the excess fluid under pressure is drawn off through the drain line 162 connected to the storage tank. The metered pressure in line 159 is less than the pressure in line 157 and therefore does not pass through the check valve 158 but instead passes through line 163 to the hydraulic actuator 48 at the bottom end of its cylinder to move the piston 47 and bell crank 46 and feed the cutter mechanism into contact with the profiled cam and the work as previously described. While supplying metered fluid pressure to the line 163, the fluid on the other side of the piston in the actuator 48 is discharged through the line 164 into the solenoid valve 156 where it is passed to the drainage line 165 connected to the storage tank 150. When the cutter mechanism is to be withdrawn from the workpiece, the solenoid 306 is deenergized and solenoid 307 is energized to actuate the valve 156 and supply fluid pressure through line 164 to the top of the actuator 48. The fluid in the bottom of the actuator is drained through line 163, line 159, check valve 158 and line 157 to the solenoid valve 156 whence it passes to drainage line 165 connected to the storage tank 150.

To obtain and index the axial movements of the cutter mechanism relative to the workpiece and the profiled control cams while the cutter mechanism is withdrawn from the workpiece, the fluid pressure in line 155 is supplied to the solenoid valve 166 which selectively supplies fluid pressure to lines 167 or 168. With the cutter mechanism withdrawn from the workpiece, solenoid 308 of the solenoid valve 166 is energized to supply fluid pressure to line 167 and connect the line 168 to the drainage line 169 leading to the storage tank 150. The fluid pressure in line 167 passes to a sequence valve 170 of conventional construction designed to valve the fluid pressure into line 171 and actuator 96, which after a complete stroke of the actuator 96, then valves the fluid pressure in line 167 to line 172 and then to the actuator 118. Fluid pressure supplied by the line 171 to actuator 96 moves the piston rod 95 to the left and rocks the lever 92 to move the bar 40 towards the headstock end of the machine against a positive stop. Fluid pressure supplied by line 172 to actuator 118 moves the shaft 120 toward the headstock end of the machine to cause an index movement of the index plate 101 as previously described. Drainage from the actuators 96 and 118 passes through lines 173 and 174 to line 168, from which it passes through the solenoid valve 166 to the drainage line 169 which is connected to the storage tank 150. Upon completion of the index stroke towards the headstock end of the machine by the shaft 120, a limit switch (not shown) having contacts 324 as shown in connection with Figure 15 of the drawings is actuated by the shaft 120 in its extreme limit of travel in that direction. The limit switch contacts 324 as actuated, deenergizes solenoid 308 and energizes solenoid 309, thus operating the valve 166 to supply fluid pressure from line 155 to line 168, line 173 and 174 and returning the pistons in the actuators 96 and 118 to their normal positions. This completes the index movements for the shaft 120 and brings the bar 40 and its stop 133 back against the new indexed stop 102 of the index plate 101. During this time fluid pressure in lines 171 and 172 is connected through the sequence valve 170 and the solenoid valve 166 to the drainage line 169 and storage tank 150.

Figure 11:
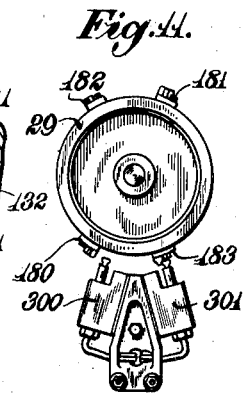
Figure 11 is a front detail view of the electrical cam control drum on the headstock.
Figure 12:
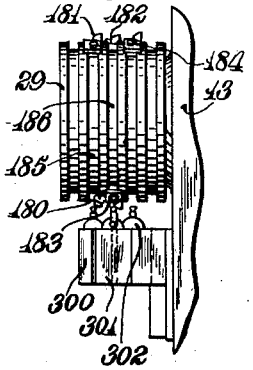
Figure 12 is a side view of Figure 11.

The electrical system for controlling the sequence of operation of the solenoid hydraulic valves 156 and 166, together with the operation of the various motors in the machine is described in connection with Figure 15 of the drawings showing the wiring diagram and Figures 11 and 12 showing the electrical control cam drum 29 geared with the workpiece spindle to operate at half the speed of the workpiece and profiled cam spindles. Cam elements 180, 181, 182, 183 and 184, are angularly located in parallel grooves on the control drum 29. Cam dogs 180 and 181 are positioned in groove 185 for cooperation with snap switch 300 and cam dogs 182 and 183 are positioned in groove 186 for cooperation with snap switch 301. All of these cam elements are adjusted to angular positions which will insure their operative contact with snap switches 300, 301 and limit switch 302 at the correct angular positions of the spindles and the profile of the workpiece in relation to the cutter mechanism. The electrical control circuit, as shown by Figure 15 of the drawing, is comprised of a motor generator and control circuit, together with an exciter and direct current control circuit for the variable speed direct-current workpiece spindle motor 14, and an alternating current control circuit for the various solenoid operated hydraulic control valves.

A three phase alternating current line 199 supplies operating voltage to the motor-generator and exciter motor 191, to the hydraulic pump motor 151, and to the cutter motor 51. The direct current spindle motor 14 is shown to obtain its operating armature current from the generator armature 193 of the motor generator, excitation voltage for its field 194, being obtained through a variable voltage derived from the field exciter generator armature 195. Rheostats or adjustable resistances 196 and 197 may be adjusted to give different values of excitation voltage to the field 194 of the direct current spindle motor 14 and hence vary the speed of said motor and these rheostats may be alternately connected in the field circuit to give an alternate range of speed control as will be more fully described hereinafter.

A pump start switch 198, which is a three contact normally open push button switch, will, when depressed, supply voltage from the line 199 thru the normally closed two contact push button master stop switch 200 to the lines 201 and 202. The voltage in line 201 passes to lines 203 and 204. Voltage in line 204 passes thru and energizes pump indicator light 205 and thru the normally closed overload release switch contacts 303a to the other line 206 of the three-phase line 199, thus completing a circuit. Voltage in line 204 also energizes relay coil 304 which closes the normally open contacts 304a, b, c, and e of a four contact switch to provide a holding circuit around the normally open push button switch 198 and supply voltage thru the three phase lines 207, 208 and 209 to the pump motor 192. Overload relay switch coils 303 are placed in series with lines 207 and 208 supplying the pump motor 192 and in event of overload on the pump motor, the current drawn thru these coils will be sufficient to open the normally closed contacts 303a, thus breaking the circuit thru relay coil 304 and returning the contacts 304a, b, c, and e to their normally open positions and deenergizing the pump motor 151.

The voltage in line 204 also energizes the relay coil 305 to close the normally open contacts 305a in the line 210 of the hydraulic solenoid master control circuit and close the normally open contacts 305b in the line 211 of the direct current excitation circuit for the field 194 of the spindle motor 14. The contacts 305a and 305b in the lines 210 and 211 constitute safety interlocks which will assure the deenergization of solenoids 306 and 307 and also the spindle motor 14 in the event the hydraulic pump circuit is broken or opened.

The push button pump start switch 198 when momentarily depressed, also supplies current to line 202 which passes thru normally closed contacts 310e and relay coil 312 to line 206 thus completing a circuit. The momentary current in relay coil 312 opens the normally closed contacts 312a in line 213 to assure that the motor generator motor 191 will not be energized during the time that the pump start switch 198 is depressed and closed.

As previously mentioned, the closing of push button switch 198 establishes a holding circuit thru contacts 304e, to connect line 199 to the master circuit line 203 leading to the relay coil 313 for the cutter motor switch contacts, the relay coil 314 for switch contacts connecting the field 194 of the spindle motor 14 for fast motion, the relay coil 315 controlling solenoid 308, the relay coil 316 controlling solenoid 309, and the relay coil 312 controlling normally closed contacts in the cutter and spindle motor circuits. The next step in the operation of the machine is to depress the motor generator normally open push button switch 214 which passes current from line 199 thru the normally closed contacts of the motor generator stop switch 215 and line 216, thru relay coil 317 and normally closed overload switch contacts 318a to line 206 completing a circuit. When relay coil 317 is energized, the normally open contacts 317a, b, and c in lines 217, 218 and 219 are closed, energizing the motor generator motor 191. At the same time the normally open contacts 317e in holding circuit 220 in parallel with the push button switch 214 are closed, thus assuring the continued energization of relay coil 317 after the push button switch 214 is released. With the motor generator motor 191 and the pump motor 151 now operating, the next operation is to depress cycle start switch 222 which is a normally open three contact push button switch. The current from the now operating exciter armature 195 which is present in line 221 is connected by the depressed cycle start switch 222 to lines 223 and 224. The current in line 223 passes thru relay coil 319 and normally closed overload switch contacts 318b to line 225, completing its circuit back to the exciter armature 195. Relay coil 319, when energized, closes the normally open contacts 319a of the holding circuit 211 in parallel with the cycle start push button 222 so that the push button may now be released and the relay coil 319 will remain energized because contacts 312a, 319a and 305b are all closed if the pump circuit is completed as previously described. Relay coil 319, when energized, also closes the normally open contacts 319b in line 226 connecting the exciter voltage in line 221 to the rheostats 196 and 197. The circuit is completed from either potentiometer 196 or potentiometer 197 thru lines 227 or 227a and the contacts 314a or 314b to energize the field 194 of the spindle motor 14 for fast or slow motion as desired. This action will be described further. Relay coil 319 also closes normally open contact 319c in line 228 which connects the armature of the spindle motor 14 to the generator armature 193. Overload relay coils 318 in the circuit of the motor generator motor 191 and the armature of the spindle motor 14 are sufficiently energized in the event of overload to either of these units to thereby open the normally closed contacts 318a and 318b and thus deenergize relay coil 319 to thereby disconnect the spindle motor from its motor generator, or deenergize relay coil 317 and disconnect the motor generator motor 191. A conventional circuit for providing dynamic braking of the spindle motor 14 when its field 194 is deenergized is provided by the relay coil 320 which is of high resistance compared to the armature of the motor 14 so that it is not energized by the motor generator. When the motor field 194 is deenergized, however, a current is generated in the armature of the coasting motor 14 due to residual magnetism in the field 194 and this current energizes relay coil 320, closing normally open contacts 320a and dissipating the generated current in the resistance 229, thus effecting a dynamic brake for the spindle motor 14.

Depressing the cycle start push button 222 to energize line 223 and start the spindle motor 14 as described also supplies current to the line 224 which energizes the closed coil 310 of a latched relay which closes its two normally open contacts 310a and 310b in lines 210 and 230 and opens its two normally closed contacts 310c and 310e in lines 231a and 202. The opening by the latched relay of contacts 310c in line 231a immediately deenergizes the closed coil 310 of the latched relay, while the opening of normally closed contacts 310e deenergizes relay coil 312 assuring that its normally closed contacts 312a in the holding circuit for the spindle motor will remain closed to allow the spindle motor 14 to continue to run. The closing by the latched relay of the normally open contacts 310a in line 230 conditions the circuit of the trip coil 311 of the latched relay so that it will be operative upon the future closing of the normally open contacts 321a in line 231 at the end of a sequence of cycle operations on a workpiece. The closing by the latched relay of the normally open contacts 310b in line 210, supplies current through the contacts 305a which as previously mentioned are closed if the pump circuit is energized thus supplying lines 232 and 233 with current for further operations.

It will be remembered that the control cam drum 29 operates at one-half the speed of the workpiece and cam spindles and hence moves through 360° of rotation to 720° of rotation for the workpiece. With the pump and spindle motors now operating the cam drum 29 will be turning to bring cams 180, 181, 182, 183 and 184 into contact with their respective snap switches 300, 301 and limit switch 302. At the time of beginning the cycle of operation to be described, the contacts 301a of snap switch 301 are closed to energize relay coil 314, which opens normally closed contacts 314b and closes normally open contacts 314a to connect the spindle motor field 194 with the fast motion potentiometer 197, causing the spindles and cam drum 29 to revolve in fast motion. As the cam drum 29 revolves, the cam dog 180 contacts switch 300 which is a double pole, double throw, snap switch and the cam dog 180 is shaped such as to throw limit switch 300 into a position closing contacts 300a and opening contacts 300b, thus energizing solenoid 306 of the hydraulic valve 156 and causing the cutter mechanism to be fed transversely in towards the workpiece. As the cutter mechanism advances towards the workpiece, the arm 60 actuates snap switch (not shown) to close the contacts 322a and energize relay coil 313 which closes normally open contacts 313a, 313b and 313c, to connect the cutter motor 51 through overload release coils 323 to the three-phase line 190. In the event of overload on the cutter motor 51, the coils 323 will be sufficiently energized to open the normally closed contacts 323a and deenergize relay coil 313, thus disconnecting the motor 51.

The metering valve 161 is adjusted to time the cutter mechanism to be fully moved transversely into the workpiece as limited by the profiled cam 24 when the workpiece spindle has revolved approximately 60° from its starting point. At this point, the cam drum 29 has moved 30° and the cam dog 183 will then contact and operate the snap switch 301, in such manner as to open contacts 301a and deenergize relay coil 314, restoring normally open contacts and normally closed contacts 314a and 314b to their normal positions and connecting the field 194 of the spindle motor 14 to the slow motion potentiometer 196, giving a speed of about 1 R. P. M. to the workpiece and profiled cam spindles. This is the relatively slow speed suitable for cutting, the high speed being employed at other times in order to reduce the idle or non-cutting time during the cycle. The rotation of the workpiece now continues for 360° of movement with the cutter mechanism operating to produce a slot of profiled depth. 360° of rotation for the workpiece will be 180° of movement for the control drum 29. At this point, dog 182 contacts snap switch 301, in such manner as to close contacts 301a and energize relay coil 314, to open normally closed and close normally open contacts 314b and 314a, to connect the field 194 of spindle motor 14 to rheostat 197 for fast motion. The workpiece spindle now continues to revolve in fast motion for another 300° of rotation, which will be 150° of rotation for the cam drum 29, making a total of 360° of rotation for the cam drum 29 from the starting point. During this time the index motions of the cutter mechanism will be completed.

At the same time that dog 182 contacts snap switch 301, dog 181 contacts snap switch 300. Cam dog 181 is shaped oppositely to cam dog 180 and therefore throws snap switch 300 in a direction to open contacts 300a and close contacts 300b, thus deenergizing solenoid 306 and energizing solenoid 307 of the hydraulic valve 156, to cause the cutter mechanism to be withdrawn from the work. As the cutter mechanism is withdrawn from the work, the arm 60 operates a snap switch (not shown) to open the contacts 322a and deenergize relay coil 313 and thus disconnecting the cutter motor 51 by opening the contacts 313a, b, and c.

Also, simultaneously with the actuation of limit switch 300 by the dog 181 at the end of 420° of rotation for the workpiece spindle and 210° of rotation for the cam drum 29, the cam dog 184 contacts limit switch 302 to momentarily open the normally closed contacts 302a in line 242 and close the normally open contacts 302b in line 242 and energize relay coil 315 through the normally closed contacts 316a. Relay coil 315, when momentarily energized, also closes normally open contacts 315a in line 241, thus energizing a holding circuit for itself in parallel with the momentarily energized limit switch contacts 302b. Relay coil 315, thus energized as described, also closes normally open contacts 315b in line 243 to energize solenoid 308 of the hydraulic valve 166 and cause the arm 40 and the cutter mechanism to be moved towards the headstock end of the machine against a positive stop. When the arm 40 reaches its limit of travel in the direction of the headstock, the hydraulic sequence valve 170, operates to cause the shaft 120 to be moved towards the headstock in a direction for moving the index plate 101 to the next index position. At the end of travel for the shaft 120 in the direction mentioned, a limit switch (not shown) is momentarily contacted to momentarily close contacts 324 and energize relay coil 316. Relay coil 316 closes contacts 316b in line 242, establishing its holding circuit around momentarily closed contacts 324. Relay coil 316 also opens normally closed contacts 316a in line 244 deenergizing solenoid 308 and closes normally open contacts 316c in line 245 to energize solenoid 309 of hydraulic valve 166, thus returning shaft 120 to its normal position and arm 40 with the cutter mechanism to its new position axially of the workpiece as determined by the new indexed position of the index plate 101.

The index motions just described, have taken place during the last 150° of rotation for the cam drum 29, thus completing 360° of rotation from its starting point. This constitutes one complete cycle of operation and 720° of rotation, or two revolutions for the workpiece spindle. It will be remembered that the spindle motor 14 has been connected for fast motion during the index motions of the mechanism and is still in this condition. At the end of 360° of rotation for the cam drum, cam dog 180 again actuates limit switch 300 to move the cutter mechanism transversely into the workpiece and start the next cycle of operation similar to the first cycle described. At the end of a predetermined number of cycles, which may be equal in number to the number of index positions for the index plate 101 and hence axial positions of the cutter mechanism relative to the workpiece and profiled control cams, a limit switch (not shown) is momentarily actuated by a dog on the bar 40. This dog and limit switch are so located and designed as to be operative when the bar 40 is moved to its extreme limit of travel towards the tailstock end of the machine as determined by the stop 102b on the index plate 101 (see Figure 8). The momentary actuation of this limit switch, momentarily closes the normally open contacts 321a in lines 231 and momentarily energizes the relay trip coil 311 of the latched relay, thus closing the contacts 310c and 310e that had been opened by the actuation of the cycle start switch 222, while also opening the contacts 310a and 310b which had been closed at the start of the cycle operations by the cycle start switch 222. This presets the latched relay consisting of coils 310 and 311 for the next sequence of cycle operations to be performed on a new workpiece which may be started by pressing the cycle start button 222. The preset movement of the latched relay which causes the contacts 310e to assume their normal closed positions, energizes the relay coil 312, causing the normally closed contacts 312a in line 213 to be opened, thus breaking the holding circuit in line 211 parallel to the cycle start switch 222 and deenergizing relay coil 319, which stops the spindle motor 14. The now open position of the contacts 310b in line 210 deenergizes all of the solenoids.

After a new workpiece has been chucked, the sequence of cycle operations may again be started by pressing the cycle start button 222, as previously described. To stop the motor generator, the normally closed push button switch 215 may be pressed to deenergize relay coil 317. The master stop switch 200, when pressed deenergizes relay coils 304 and 305, thus stopping the pump motor 151 and through the interlocks, previously described, deenergizing all other electrical circuits which may at the moment be energized.

If desired, an electrical counter mechanism (not shown) may be used in place of the limit switch contacts 321a to stop the machine after a desired number of indexed cycles of operation. This counter mechanism could be set to operate the latched relay coils 310 and 311 in a similar manner as is done by the limit switch contacts 321a. The counter mechanism could receive its impulses from the limit switch 316, which is operated once at the end of each cycle and if, for example, the counter mechanism is set for eight cycles, the latched relay coils 310 and 311 would be operated upon the completion of eight cycles of operation to thereby stop the spindle motor and deenergize the solenoids.

It is to be understood that the form of the invention herewith shown and described is to be taken as the preferred embodiment of the same, and that various changes in shape, size and arrangement of parts may be resorted to without departing from the spirit of the invention or the scope of the following claims.

I claim:

1. In a machine tool, a rotatable work piece spindle, means on said spindle for supporting a work piece, cutting means movable transversely of said spindle into and out of cutting relation to a work piece rotatable with said spindle, profile control means including cams rotatable with said work spindle and a follower for said cams controlling movement of said cutting means transverse to said spindle while in cutting relation to the work piece, means for moving said cutting means and follower transversely into and out of cutting relation to the work piece and cooperative relation to one or another of said cams, respectively, means effective on each complete rotation of said work spindle for actuating said moving means to retract said cutter and follower from the work piece and cam, respectively, means for moving said cutter and follower lengthwise of said axis, means for actuating said moving means while said cutter and follower are so retracted to move said cutter and follower lengthwise of said axis to a retracted axial position, a plurality of indexable stops determining different axial distances from said retracted position corresponding to operative positions of the several rotatable cams, means actuated by said axially moving means to index said stops to present them successively into operative position, means actuating said axially moving means to move said tool and follower away from said retracted axial position as far as permitted by the particular stop then in operative position, and means for then actuating said cutter moving means to move said cutter relative to the work and said follower in controlled relation to the cam corresponding to the axial position determined by the operative stop.

2. In a machine tool, a rotatable work piece spindle, means on said spindle for supporting a work piece, cutting means movable transversely of said spindle into and out of cutting relation to a work piece rotatable with said spindle, control means including cams rotatable with said work spindle and a follower for said cams controlling movement of said cutting means transversely of said spindle while in cutting relation to the work piece, means for moving said cutting means and follower transversely into and out of cutting and cam-controlled positions, respectively, means effective when said work piece has completed a revolution for actuating said moving means to remove said cutting means from cutting position and said follower from cam-controlled relation, means for moving said cutting means and follower longitudinally of said axis, a stop-carrying member indexable about an axis, a plurality of stops carried by said member each corresponding to one of said cams and defining by contact therewith of a part movable axially with said cutting means and follower limiting positions for said longitudinal moving means, means effective to actuate said longitudinal moving means when said cutting means and follower are in retracted lateral position to a retracted axial position and then in the opposite direction to an operative limiting longitudinal position determined by the stop then in indexed operative position, and means actuated by said axial motion of said cutting means and follower for indexing said stop-carrying member.

3. In a machine tool, a rotatable work piece spindle, means on said spindle for supporting a work piece, a rockable and axially movable bar arranged parallel to said work piece, a cutter arm carried by said bar, a cutter carried by said arm to move toward and from a work piece carried by said supporting means by rocking of said bar to feed and retract said cutter and to be indexed axially of the work, a rotary shaft parallel to said spindle, a plurality of contour cams secured to said shaft, means connecting said shaft and spindle for simultaneous rotation, a cam follower arm carried by said bar, a follower on said follower arm for engagement selectively with said contour cams according to the axial position of said bar, means actuable to rock said bar to bring said follower against and hold it in contact with one of said cams and to move said cutter toward the work piece or to retract said follower from said cam and said cutter away from said work piece, a transverse shaft beyond one end of said bar, a carrier supported on said transverse shaft, stops one corresponding to each contour cam carried by said carrier and spaced angularly about said transverse shaft and selectively positioned by indexing of said transverse shaft in alinement with said bar, means for moving said bar axially, a fixed stop limiting said axial movement away from said carrier stops, means for actuating said axial moving means to move said bar against said fixed stop when said cutter means and follower are retracted, carrier indexing means actuable when said bar is so moved to bring a different carrier stop into line with said bar, means actuable thereafter to move said bar axially into contact with said different stop, and means for then actuating said bar-rocking means to return said cutter to the work piece and said follower to the cam corresponding to the carrier stop then in stopping position.

JOHN E. LOVELY.

REFERENCES CITED

The following references are of record in the file of this patent:

UNITED STATES PATENTS

| Number | Name | Date |
|---|---|---|
| 1,783,755 | Trefethen | Dec. 2, 1930 |
| 1,840,231 | Harrison | Jan. 5, 1932 |
| 2,109,386 | Green | Feb. 22, 1938 |
| 1,865,527 | Lovely | July 5, 1932 |
| 1,017,879 | Landis | Feb. 20, 1912 |
| 2,130,627 | Kelly | Sept. 20, 1938 |
| 468,283 | Guerrant | Feb. 2, 1892 |
| 1,322,005 | Fredette | Nov. 18, 1919 |
| 2,078,463 | Silven | Apr. 27, 1937 |

FOREIGN PATENTS

| Number | Country | Date |
|---|---|---|
| 22,895 | Great Britain | Oct. 8 1912 |